United States Patent [19]

Saito et al.

[11] 4,387,136
[45] Jun. 7, 1983

[54] MAGNETIC RECORDING MEDIUM AND APPARATUS FOR PREPARING THE SAME

[75] Inventors: Seitoku Saito; Fumio Maruta; Toshiaki Izumi; Hiroshi Sugihara, all of Tokyo, Japan

[73] Assignee: TDK Electronics Co., Ltd., Tokyo, Japan

[21] Appl. No.: 246,672

[22] Filed: Mar. 23, 1981

[30] Foreign Application Priority Data

Apr. 8, 1980 [JP] Japan .................................. 55/46083

[51] Int. Cl.$^3$ .......................................... G11B 5/66
[52] U.S. Cl. .................................... 428/328; 360/134;
360/135; 360/136; 427/131; 427/132; 428/694;
428/900
[58] Field of Search ............... 427/132, 131, 128, 191,
427/250, 255.7, 291; 428/694, 695, 692, 900,
328, 212; 360/134, 135, 136, 131

[56] References Cited

U.S. PATENT DOCUMENTS

| | | | |
|---|---|---|---|
| 3,117,065 | 1/1964 | Wootten | 427/48 |
| 3,342,633 | 9/1967 | Bate et al. | 427/131 |
| 4,153,920 | 5/1979 | Shirahata et al. | 427/131 |
| 4,260,466 | 4/1981 | Shirahata et al. | 427/132 |

FOREIGN PATENT DOCUMENTS

2622597 12/1976 Fed. Rep. of Germany ...... 427/132

OTHER PUBLICATIONS

Brunsch et al., Vacuum-Deposited Particulate Magnetic Recording Layer, IBM Technical Disclosure Bulletin, vol. 21, No. 10 (Mar. 1979) pp. 4082-4083.
Bickert et al., Producing High Coercivity Vacuum Deposited Magnetic Tapes, IBM Technical Disclosure Bulletin, vol. 8, No. 5 (Oct. 1965) pp. 702-703.

*Primary Examiner*—Stanley S. Silverman
*Attorney, Agent, or Firm*—Oblon, Fisher, Spivak, McClelland & Maier

[57] ABSTRACT

A thin metallic layer type magnetic recording medium having thin metallic layers in a structure comprises a layer in which a tilt angle of a metallic particle direction to the normal line to said substrate gradually increases depending upon an increase of a distance from said substrate; and a layer in which a tilt angle of a metallic particle direction to the normal line to said substrate gradually decreases depending upon an increase of a distance from said substrate.

1 Claim, 3 Drawing Figures

F I G. 1
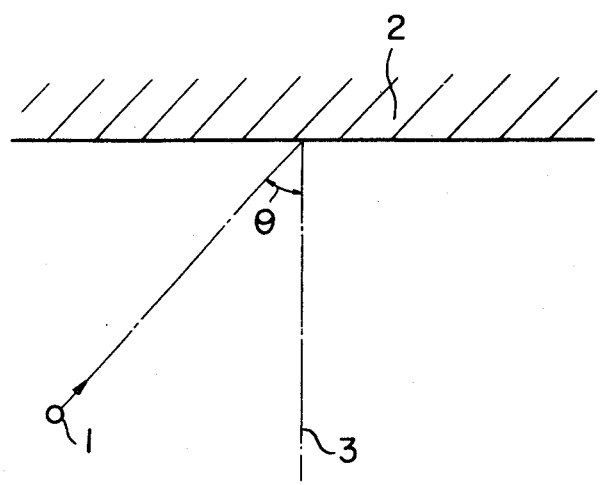
F I G. 3
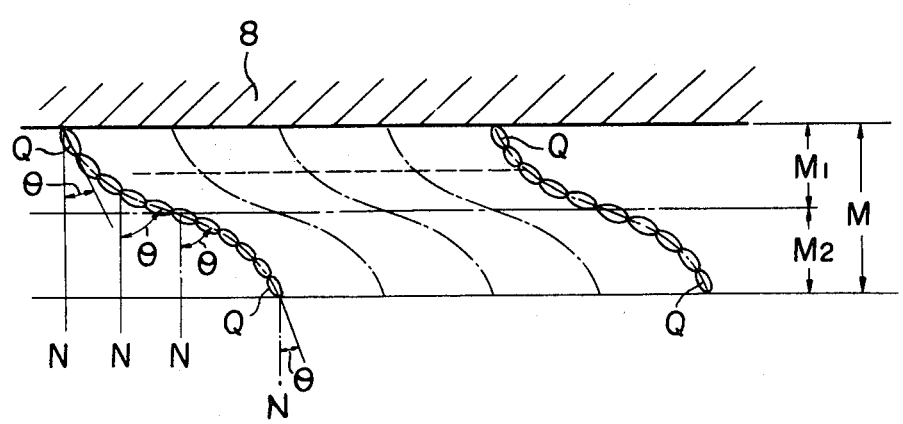

MAGNETIC RECORDING MEDIUM AND APPARATUS FOR PREPARING THE SAME

BACKGROUND OF THE INVENTION

1. Field of the Invention

The present invention relates to a thin metallic layer type magnetic recording medium suitable for high density magnetic recording and an apparatus for preparing the same.

2. Description of the Prior Art

Recently, high density magnetic recording technology has been remarkably developed by improvements of a recording and reproducing system, a running system, a magnetic head and a magnetic recording medium in a magnetic recording apparatus. In these developments, the requirement of high density magnetic recording for the magnetic recording medium has been attained by an increase of a coercive force and an increase of a residual magnetic flux density for reducing a thickness of the medium. It has been difficult to increase the residual magnetic flux density over 3,000–4,000 gauss in a conventional magnetic recording medium prepared by coating a mixture of a magnetic powder and a binder. The magnetic recording density could not be further increased. Recently, thin metallic layer type magnetic recording media which do not contain an organic binder have been developed. The thin metallic layer type magnetic recording media have been prepared by forming a thin metallic layer on a substrate by forming metallic particles made of a metal or alloy of iron group element or an alloy thereof with an element other than iron group elements by a vacuum evaporation, sputtering, ion-plating, ion beam evaporation or electrochemical method and depositing the metallic particles on a non-magnetic substrate.

Among these methods, the vacuum evaporation method has been especially developed as the technology for preparing uniform, long magnetic recording media in an industrial scale.

The following methods have been proposed to increase a coercive force and to improve a squareness in the vacuum evaporation method.

(a) a tilt deposition;
(b) a deposition in a magnetic field;
(c) a control by a selection of a material for a base; and
(d) a crystalline growth by a heat treatment.

Among these methods, the most effective practical method is the tilt deposition process disclosed in Japanese Examined Patent Publication No. 19389/1966. In this process, as shown in FIG. 1, a thin metallic layer is formed by a tilt deposition of a metallic particles (1) at a tilt angle $\theta$ to the normal line (3) of a surface of a substrate (2). In this process, if multi-layers are formed at a constant tilt angle $\theta$, the metallic particles in the multi-layers have orientation in one direction to extend an apparent length so as to improve shape anisotropy whereby a coercive force is increased. However, in order to give the multi-layer structure of the thin metallic layer, the vacuum evaporation must be repeated depending upon number of the layers. Thus, it causes disadvantages of inferior productivity and higher production cost. In order to overcome the disadvantages, the number of the thin metallic layers must be reduced. Thus, the magnetic characteristics and the electro-magnetic conversion characteristics are inferior.

SUMMARY OF THE INVENTION

It is an object of the present invention to overcome the disadvantages of the conventional process and to provide an apparatus for preparing a thin metallic layer type magnetic recording medium by a tilt deposition in a vacuum evaporation.

It is another object of the present invention to provide a magnetic recording medium having excellent magnetic characteristics and electro-magnetic conversion characteristics.

The foregoing and other objects of the present invention have been attained by providing a thin metallic layer type magnetic recording medium having thin metallic layers in a structure comprising a layer in which a tilt angle of a metallic particle direction to the normal line to said substrate gradually increases depending upon an increase of a distance from said substrate, and a layer in which a tilt angle of a metallic particle direction to the normal line to said substrate gradually decreases depending upon an increase of a distance from said substrate.

A thin layer type magnetic recording medium can be prepared by using an apparatus comprising a vacuum atmosphere; a substrate running along a cylindrical peripheral surface of a can; an evaporation source containing an evaporation base material to face each other to feed a vapor flow from said evaporation source in tilt to said substrate on said can, wherein two cans are provided for one evaporation source and said vapor flow is fed from said evaporation source to said substrate to initiate the deposition of particles from small tilt angle on the first can whereas from large tilt angle on the second can.

BRIEF DESCRIPTION OF THE DRAWINGS

FIG. 1 shows a relation of a substrate and a tilt angle of metallic particles;

FIG. 3 shows a structure of a thin metallic layer type magnetic recording medium obtained by the apparatus shown in FIG. 2.

DETAILED DESCRIPTION OF THE PREFERRED EMBODIMENTS

Figure 2:
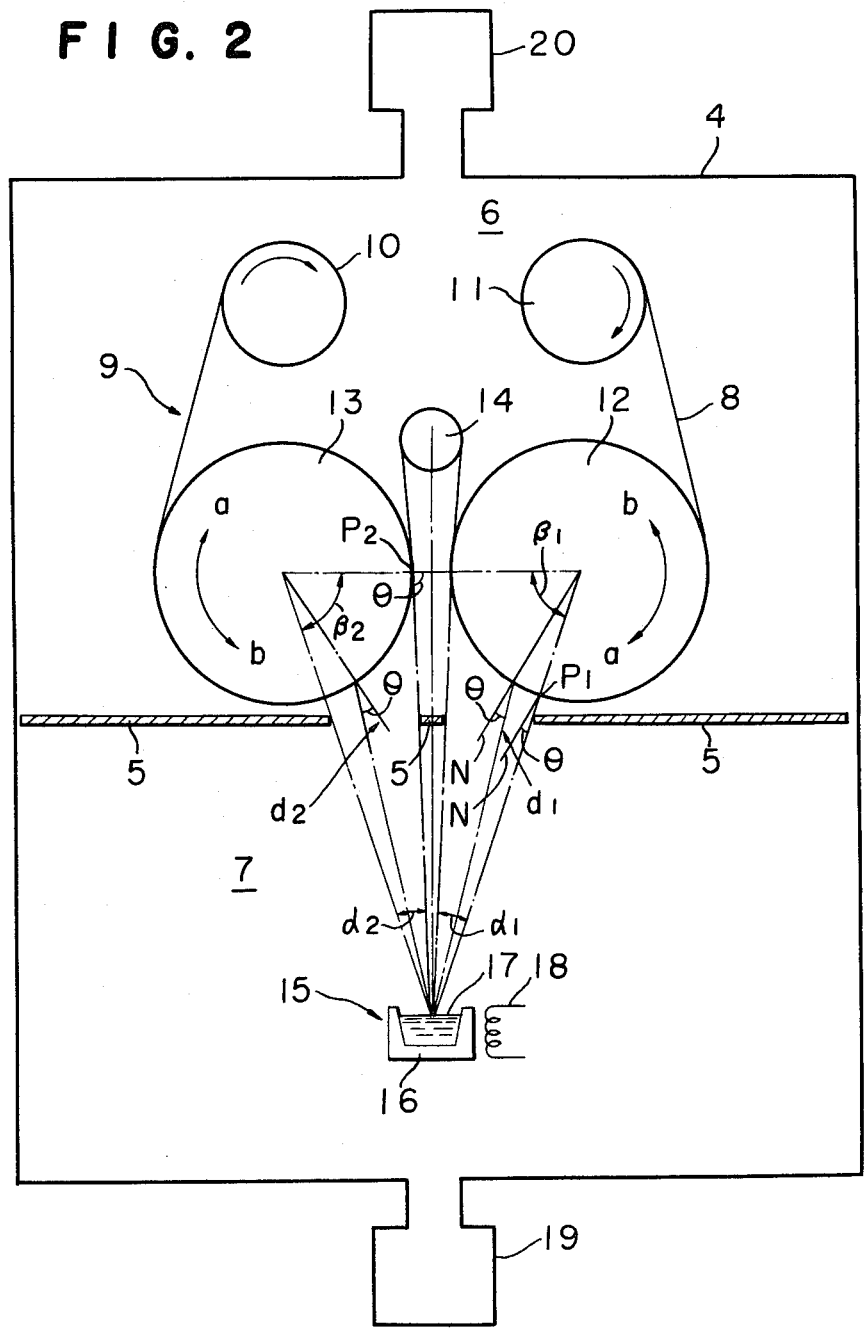
FIG. 2 is a schematic sectional view of an apparatus for preparing a magnetic recording medium according to the present invention.

Referring to the drawings, embodiments of the present invention will be illustrated.

FIG. 2 is a schematic sectional view of one embodiment of an apparatus for preparing a magnetic recording medium according to the present invention. In FIG. 2, the reference numeral (4) designates a vacuum tank for a vacuum atmosphere; and the inside of the vacuum tank (4) is partitioned into two chambers (6), (7) by partition (5) and slits ($d_1$), ($d_2$) as passages for a metallic vapor flow are formed on the partition (5) near the center. In the upper chamber (6) partitioned by the partition (5), a running system (9) for running a long non-magnetic substrate (8) such as a polyester film is formed. The running system (9) comprises a shaft (10) for winding up the substrate (8); a shaft (11) for feeding the substrate (8); two cylindrical cans (12), (13) and a guide roll (14). The substrate (8) is fed out from the shaft (11) is sequentially brought into contact with the peripheral cylindrical surface of the can (12)→ the roll (14)→ the peripheral cylindrical surface of the can (13) and is fed to the winder shaft (10). The substrate (8) runs at a desired speed in a desired direction depending upon the rotations of the shaft (10) and the shaft (11) to the a direction or the b direction.

The cans (12), (13) respectively have the same height of the shafts in parallel and are placed to approach the peripheral surfaces.

In the lower chamber (7) formed below the partition (5), one evaporation source (15) is placed in the same distance from the two cans (12), (13). A kind of the evaporation source (15) is not critical, though an electron-beam type evaporation source is schematically shown in the embodiment. The evaporation base material (17) in a water cooled copper vessel (16) is heated to evaporate it by an accelerated electron beam generated by actuation of an electron generator (18). The evaporation base material (17) can be metal or alloy of iron group elements such as cobalt, nickel and iron or an alloy of an iron group element with another element other than iron group elements. The reference numerals (19), (20) designate gas outlets. In the apparatus having the structure, the vapor flow from the evaporation base material (17) is fed through the slits ($d_1$), ($d_2$) of the partition (5) to the surface of the substrate (8) running along the peripheral surfaces of the cans (12), (13) to deposit it as metallic particles. The vapor flow is fed to deposit on the substrate (8) running on the cans (12), (13) under spreading it at plane angles $\alpha_1$, $\alpha_2$ which are respectively angles of the edge of the slit $d_1$ or $d_2$ to the tangential line of the can from the evaporation source (15). Vapor flow deposition regions having central angle $\beta_1$ or $\beta_2$ corresponding to the angle $\alpha_1$ or $\alpha_2$ are formed on the substrate (8) running on the cans (12), (13).

When the substrate (8) runs on the cans (12), (13) in the direction of the arrow line a, the tilt angle $\theta$ of the vapor flow to the normal line (8) of the substrate (8) on the first can (12) is minimum at the point $P_1$ initiating the feed of the vapor flow from the evaporation source (15) and the tilt angle $\theta$ gradually increases depending upon the running of the substrate (8) in the direction a.

On the other hand, the tilt angle $\theta$ on the second can (13) is maximum at the point $P_2$ initiating the feed of the vapor flow on the substrate (8) again and the tilt angle $\theta$ gradually decreases depending upon the running of the substrate (8) in the direction a.

Thus, the thin metallic layers M of the magnetic recording medium prepared by the apparatus has the multi-layer structure having a layer $M_1$ in which the tilt angle $\theta$ of the direction of the metallic particle Q to the normal line to the substrate (8) gradually increases depending upon an increase of a distance from the substrate (8) and a layer $M_2$ in which the tilt angle $\theta$ of the direction of the metallic particle $\theta$ to the normal line to the substrate (8) gradually decreases depending upon an increase of a distance from the substrate (8).

It has been found that the magnetic recording medium having excellent magnetic characteristics and electro-magnetic conversion characteristics can be obtained by forming such structure. This is considered that the metallic particles Q are continuously connected under varying their direction whereby the magnetic characteristics are improved and the apparent length is extended and the shape anisotropy is improved.

Moreover, the two thin metallic layers can be formed in one step using the two cans (12), (13) whereby the efficiency for forming thin metallic layers can be improved in about two times of that using only one can.

The embodiment of the magnetic recording medium obtained by the apparatus of the present invention will be illustrated by certain examples wherein diameters of the cylindrical cans (12), (13), a kind of the evaporation source (15) and a relation of positions of the cans (12), (13) and the evaporation surface are varied.

EXAMPLE 1

Each magnetic recording medium was prepared under the following condition in an apparatus shown in FIG. 2.

Substrate: polyester film having a thickness of 12 μm.
Base material for evaporation (17): Cobalt-nickel alloy of Co:Ni of 80:20 by weight.
Vacuum in upper chamber (6): $1 \times 10^{-2} - 1 \times 10^{-3}$ Torr.
Vacuum in lower chamber (7): $1 \times 10^{-5} - 1 \times 10^{-6}$ Torr.
Metallic layer forming rate: 2,000 Å/min. provided to be at a running speed of the substrate (6) is zero.
Substrate running speed: 40 cm/min.
Substrate running direction: a direction.
Temperature in can: 70°–80° C.

The partition (5) was set so as to give 60 degrees of the minimum tilt angle $\theta$ of the metallic vapor flow fed into the can (12). The partition (5) was also set so as not to flow the metallic vapor flow into the can (13). The resulting magnetic recording medium is referred to as Sample $A_1$.

The partition (5) of the can (12) was not moved and the partition (5) was set so as to give 60 degree of tilt angle $\theta$ of the metallic vapor flow to the can (13). The resulting magnetic recording medium is referred to as Sample $B_1$.

EXAMPLE 2

In accordance with the process of Example 1 except using iron metal Fe as the evaporation base material, samples were prepared. The resulting samples of the magnetic recording medium are referred to as Samples $A_2$, $B_2$ corresponding to Example 1.

Characteristics of the samples $A_1$, $A_2$, $B_1$, $B_2$ obtained in Examples 1 and 2 were measured and shown in Table 1.

TABLE 1

| Characteristics: | Sample No. | | | | note |
| --- | --- | --- | --- | --- | --- |
| | $A_1$ | $B_1$ | $A_2$ | $B_2$ | |
| Thickness of layers (μm) | 0.06 | 0.11 | 0.05 | 0.09 | |
| Coercive force (Oe) | 640 | 970 | 530 | 710 | *1 |
| Residual magnetic flux density (G) | 7000 | 9000 | 6000 | 7000 | *1 |
| Squareness ratio (Br/BM) | 0.95 | 0.95 | 0.90 | 0.90 | |
| Noise level (dB) | 0.0 | −2.0 | 0.0 | −1.5 | *2 |
| Sensitivity (dB) | 0.0 | +3.0 | 0.0 | +2.0 | *3 | note:
*1: The data were measured by VSM-III type: Applied magnetic field of 5000 (Oe).
*2: Table speed of 4.75 cm/sec.
*3: Sensitivity in 333 Hz.

As it is found in Table 1, the thickness of the thin metallic layers of the samples $B_1$, $B_2$ of the present invention are respectively about two times of the thickness of the corresponding samples $A_1$, $A_2$ prepared by the conventional one can process. The efficiency is also improved for two times. The magnetic characteristics such as the coercive force and the residual magnetic flux density of the samples $B_1$, $B_2$ are remarkably superior to those of the samples $A_1$, $A_2$. The improvement of the magnetic characteristics is found. The residual magnetic flux density is not usually affected by a factor of a thickness of metallic layers. Nevertheless, the residual magnetic flux densities of the samples $B_1$, $B_2$ are superior to those of the samples $A_1$, $A_2$. The fact shows the effect of the improvement of the magnetic characteristics in the present invention.

In the electro-magnetic conversion characteristics measured by using a commercial cassette type recorder, the noise levels (comparison of bias noise; tape speed of 4.75 cm/sec. High position) of the samples $B_1$, $B_2$ are respectively improved for 2.0 dB and 1.5 dB in comparison with the samples $A_1$, $A_2$. The sensitivities in 333 Hz of the samples $B_1$, $B_2$ are also respectively improved for 3.0 dB and 2.0 dB.

As described above, in accordance with the present invention, the apparatus comprises the vacuum atmosphere, the substrate running along a cylindrical peripheral surface of a can; an evaporation source containing an evaporation base material to face each other to feed a vapor flow from the evaporation source in tilt angle to the substrate on the can wherein the two cans are provided for one evaporation source and the vapor flow is fed from the evaporation source to the substrate to initiate the deposition of particles from small tilt angle on the first can whereas from large tilt angle on the second can, whereby the apparatus can prepare the thin metallic layer type magnetic recording medium by the tilt deposition at high efficiency and the thin metallic layer type magnetic recording medium having excellent magnetic characteristics and electro-magnetic conversion characteristics can be obtained.

We claim:

1. A magnetic recording medium comprising binderless thin metallic layers formed on a substrate in which tilt angle of metallic particles relative to the normal line to said substrate gradually increases in one layer and tilt angle of metallic particles relative to the normal line to said substrate in another layer gradually decreases depending upon an increase in distance from said substrate.

* * * * *